(No Model.) 3 Sheets—Sheet 1.
A. G. NEVILLE.
GLASS POT FURNACE.
No. 451,836. Patented May 5, 1891.
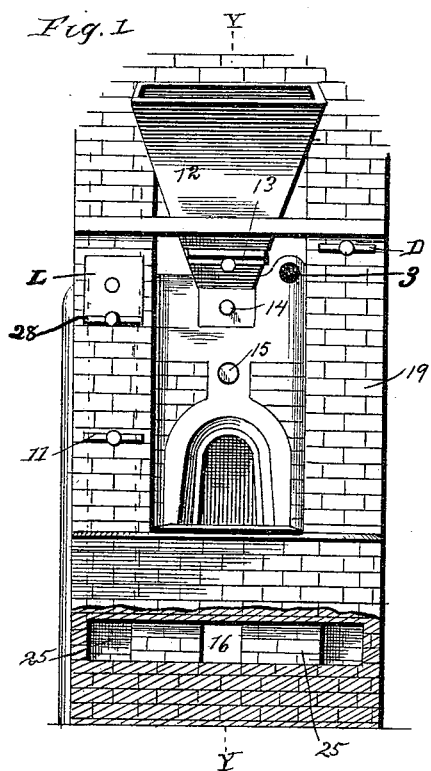
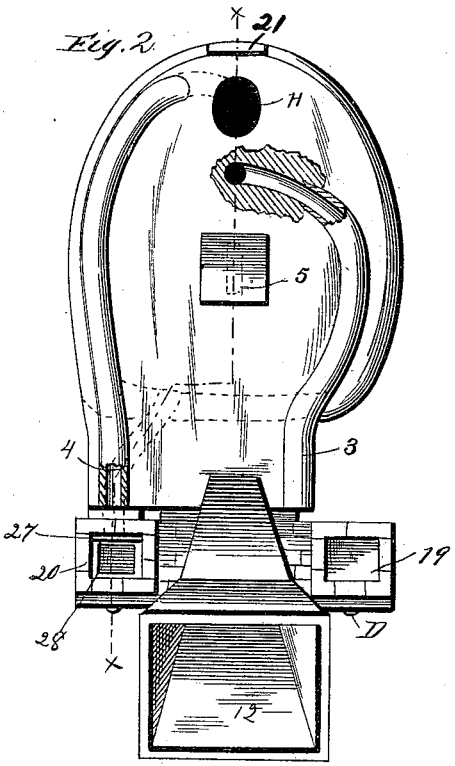
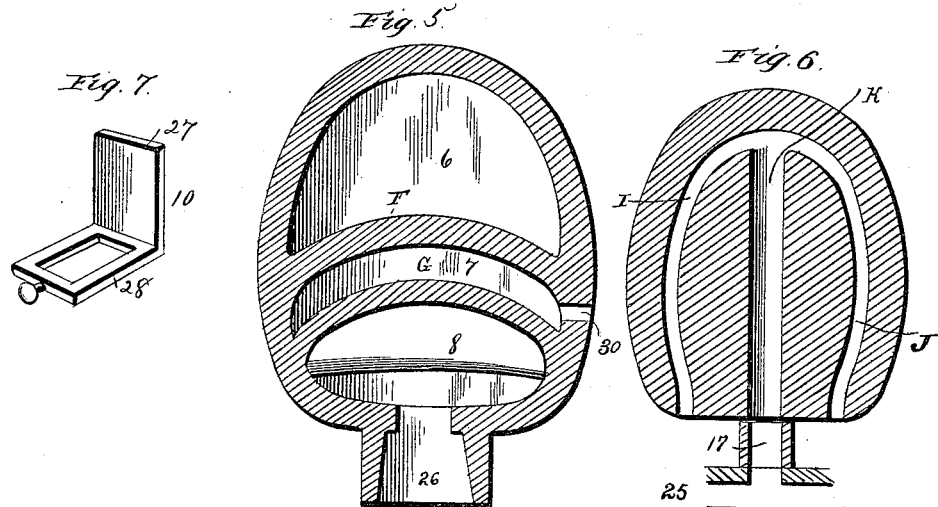
Witnesses:
C. H. Raeder
Van Buren Hillyard
Inventor
Asa G. Neville
By R. H. A. Lacy
his Attorneys (No Model.) 3 Sheets—Sheet 2.

A. G. NEVILLE.
GLASS POT FURNACE.

No. 451,836. Patented May 5, 1891.

Witnesses:
E. H. Raeder
Van Buren Hillyard.

Inventor
Asa G. Neville
By R. H. H. Lacey
His Attorneys (No Model.) 3 Sheets—Sheet 3.
A. G. NEVILLE.
GLASS POT FURNACE.
No. 451,836. Patented May 5, 1891.
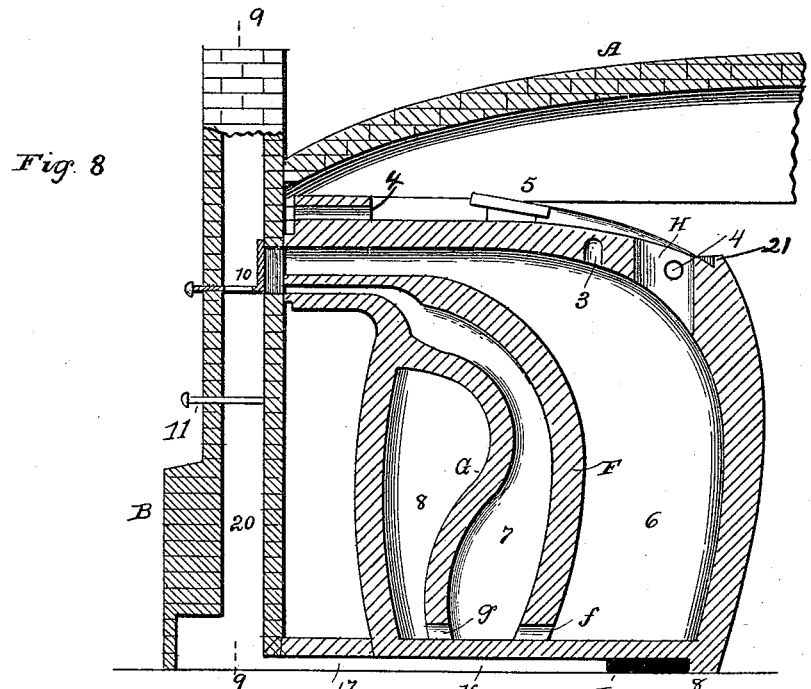
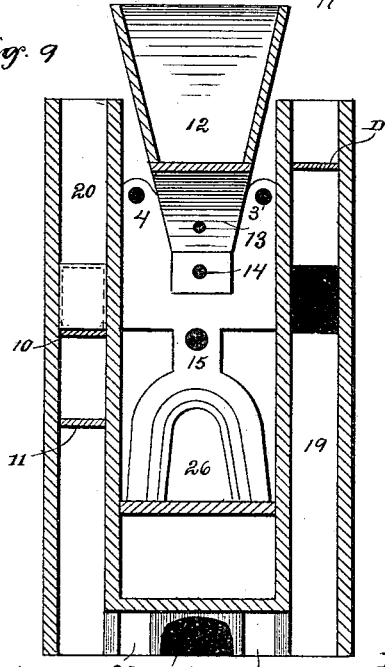
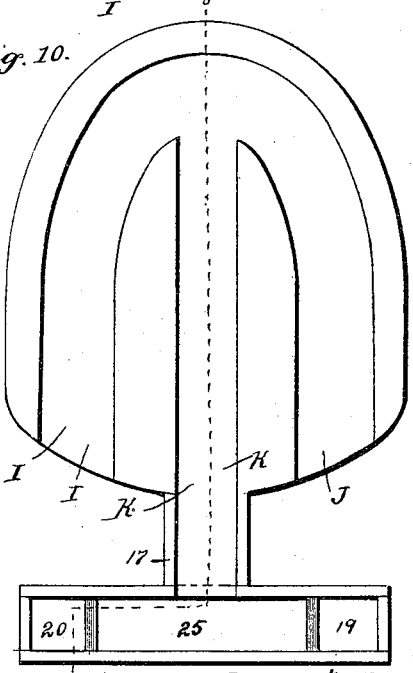
Attest.
Victor J. Evans
Van Buren Hillyard.
Inventor.
Asa G. Neville.
By R. S. & A. P. Lacey
Attys.
THE NORRIS PETERS CO., PHOTO-LITHO., WASHINGTON, D. C.

UNITED STATES PATENT OFFICE.

ASA G. NEVILLE, OF LAZEARVILLE, WEST VIRGINIA.

GLASS-POT FURNACE.

SPECIFICATION forming part of Letters Patent No. 451,836, dated May 5, 1891.

Application filed November 30, 1889. Serial No. 332,111. (No model.)

*To all whom it may concern:*

Be it known that I, ASA G. NEVILLE, a citizen of the United States, residing at Lazearville, in the county of Brooke and State of West Virginia, have invented certain new and useful Improvements in Glass-Pot Furnaces; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to glass-melting pots and furnaces, and has for its object to provide a pot that will be continuous in its action, and in which the glass will be melted and plained at one and the same time.

The improvement consists of the novel features which will be hereinafter more fully described and claimed, and which are shown in the annexed drawings, in which—

Figure 3:
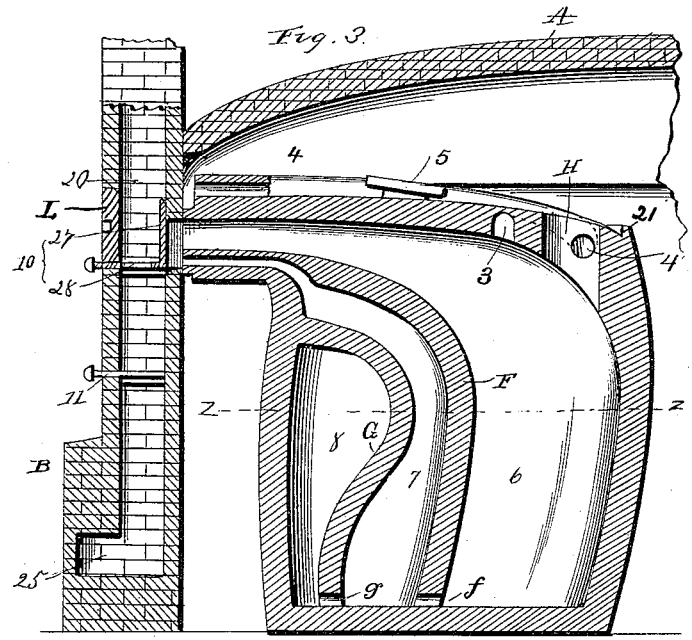
Figure 4:
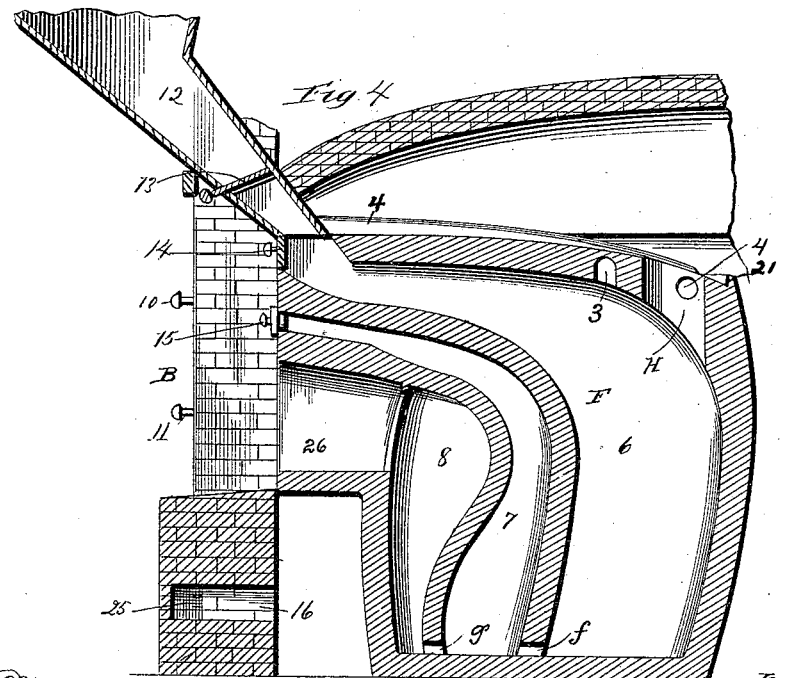

Figure 1 is a front view of a section of glass-melting furnace embodying my invention. Fig. 2 is a top plan view, parts being broken away, of a furnace or so much as shown in Fig. 1. Fig. 3 is a vertical section on the line X X of Fig. 2. Fig. 4 is a vertical section on the line Y Y of Fig. 1. Fig. 5 is a horizontal section on the line Z Z of Fig. 3. Fig. 6 is a horizontal section of a modified form of glass-melting pot. Fig. 7 is a perspective view of the damper for closing the passage between the pot and flue. Fig. 8 is a vertical cross-section of a modification about on the line 8 8 of Fig. 10. Fig. 9 is a vertical section on the line 9 9 of Fig. 8. Fig. 10 is a bottom plan view of the pot and the furnace-wall of the modified form shown in Fig. 8. Fig. 11 is a front view of the lower portion of the pot.

B represents the breast-wall, and A the crown or deflector of a glass-melting furnace of ordinary construction.

19 and 20 represent two flues, which communicate at their lower ends with the interior of the furnace through the lateral passages 25 25 and the opening 16 and which terminate at their upper ends in the stack. The damper D controls the passage through flue 19, and the damper 11 regulates the passage through flue 20. The damper 10 closes the opening between the pot and the flue 20, and is composed of the vertical member 27 and the horizonal open frame 28. The vertical member 27 closes the said opening, and the open frame 28 extends across the flue and has bearings therein to guide the damper in its movements. The horizontal member of frame 28 is open, so as not to interrupt the draft through the flue 20. The stopper or plug L in the front wall of the flue 20 opposite the damper 10 permits of the removal of the said damper for repairs or purposes of cleaning.

The melting-pot E is divided internally by the two partitions F and G into three compartments 6, 7, and 8, which are in communication by reason of the openings *f* and *g* in the bottom of the said partitions. The compartment 6 is adapted to receive the material and is the reducing-chamber. The compartment 7 is the refining or plaining chamber and is of larger capacity at its lower than at its upper end, and has a lateral opening 30 above the melting-line. (See Fig. 5.) The compartment 8 is the receiving-chamber for the refined and molten glass, which is removed through the mouth 26 of the pot taken just above the bench of the furnace about on the line X X of Fig. 8. The stopper 14 closes the opening into compartment 6, and can be removed, when desired, to stir or loosen the batch. The plug 15, closing an opening into the plaining-compartment 7, can be removed when entrance is required to the plaining-compartment.

The hopper 12 is of ordinary construction and communicates with the batch receiving and reducing compartment 6, and is provided with the slide or cut-off 13, by which the feed of the batch to the pot is regulated or cut off. 3 is the hot-air flue, and 4 is the hot-blast passage. The passage 3 is formed in the crown of the pot and is designed to supply air to the interior of the pot for sustaining and promoting combustion, the air being heated prior to its entrance into the pot to prevent chilling the glass. The passage 4, also formed in the crown of the pot, is to be suitably connected with a blower of ordinary construction to supply a hot-air blast, which will force the flame down onto the glass or glass-making material in the pot.

H is the flame-opening in the crown of the pot and is adapted to be closed by the cover 5. The lug 21 on the rear part of the pot-crown is provided to prevent the cover from slipping off the pot when pushed back into place.

In order that the heat may be used to the best possible advantage, it has been found expedient to provide passages beneath or in the bottom of the pot in any desired style or shape, through which the flame is forced to circulate. In Fig. 6 these passages I and J meet at their inner ends and join the passage K, which communicates with the flues 19 and 20 through the passages 17, 16, and 25.

The operation of the invention is manifest from the foregoing description. However, it may be well to state that the material is supplied to the hopper 12 in large quantities and passes therefrom into the compartment 6 of the pot, where it is reduced. The molten glass escapes through openings $f$ and $g$ into the receiving-chamber 8, first passing through the chamber 7, in which it is plained or refined. The glass can be taken from compartment 8, and that removed will be replaced by fresh glass from the compartments 6 and 7, the process being continuous. When dampers D and 11 are drawn out, the flame is drawn up flues 19 and 20; but when the dampers 11 and D are pushed in and the damper 10 drawn out the flame passes around and through the pot, as will be readily appreciated.

Having fully described my invention, what I claim, and desire to secure by Letters Patent, is—

1. In a glass-melting furnace, the combination, with the breast-wall having flue 20 and the glass-melting pot having connection with the said flue and having flame-passages in its bottom leading into flue 20, of the damper 10, composed of a horizontal and a vertical member, the horizontal member being an open frame and the vertical member adapted to close the passage between the pot and the flue 20, substantially as described.

2. In a glass-furnace, the combination, with the breast-wall having flues 19 and 20 and the glass-melting pot having a series of compartments 6, 7, and 8, the compartment 6 having communication with each of the flues 19 and 20 and having flame-passages leading into the flues 19 and 20, of the damper D in flue 19 above the point of communication with said flue of the compartment 6, and the dampers 10 and 11 in the flue 20, the damper 10 being above the damper 11 and adapted to close the passage between compartment 6 and the flue 20, substantially as and for the purpose described.

3. The combination, in a glass-melting furnace having flues 19 and 20, of a glass-melting pot having a series of compartments 6, 7, and 8, which communicate at their lower ends, and having flame-passages in its bottom leading into each of the flues 19 and 20, the compartments 7 and 8 opening through the front wall of the furnace, the former being contracted at its upper end, and the compartment 6 communicating with both flues 19 and 20, and dampers in the flues 19 and 20 for controlling the passage of the flame through and beneath the pot, substantially as described, for the purpose specified.

In testimony whereof I affix my signature in presence of two witnesses.

ASA G. NEVILLE.

Witnesses:
WM. BECK,
G. T. MARSH.